United States Patent
Yamanashi et al.

(10) Patent No.: US 6,447,735 B1
(45) Date of Patent: Sep. 10, 2002

(54) EXHAUST PURIFIER AND MANUFACTURING METHOD OF SAME

(75) Inventors: Fuminori Yamanashi, Tokyo; Kimiyoshi Nishizawa, Yokohama, both of (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/288,213

(22) Filed: Apr. 8, 1999

(30) Foreign Application Priority Data

Apr. 30, 1998 (JP) .......................... 10-120669
May 19, 1998 (JP) .......................... 10-136611

(51) Int. Cl.[7] .................... B01D 53/88; B01D 53/72; F01N 3/28
(52) U.S. Cl. ................... 422/171; 422/177; 422/180; 29/890
(58) Field of Search .................. 422/171, 177, 422/180, 211, 222; 60/299, 297; 29/890

(56) References Cited

U.S. PATENT DOCUMENTS

| | | | | |
|---|---|---|---|---|
| 5,108,716 A | * | 4/1992 | Nishizawa .................. 422/171 |
| 5,538,697 A | * | 7/1996 | Abe et al. .................. 422/171 |
| 5,866,079 A | * | 2/1999 | Machida et al. ............. 422/180 |
| 6,113,864 A | * | 9/2000 | Kueper et al. .............. 422/180 |

FOREIGN PATENT DOCUMENTS

| JP | 06-185342 | * | 7/1994 |
|---|---|---|---|
| JP | 7-332073 | | 12/1995 |
| WO | 96/17157 | * | 6/1996 |

* cited by examiner

*Primary Examiner*—Hien Tran
(74) *Attorney, Agent, or Firm*—Foley & Lardner

(57) ABSTRACT

Plural hydrocarbon HC adsorbing units (A1–A3) and plural three-way catalysts (B1–B3) are accommodated in a shell (2). The HC adsorbing units (A1–A3) and three-way catalysts (B1–B3) are disposed alternately in series, and one of the HC adsorbing units (A1–A3) is disposed in the position nearest to an inlet (14) of the shell (2). The HC contained in exhaust gas when the engine is started cold is first adsorbed by the HC adsorbing units (A1–A3), and the HC desorbed from the HC adsorbing units (A1–A3) with temperature rise is oxidized by the adjacent three-way catalysts (B1–B3) situated downstream. The heat capacities of the HC adsorbing units (A1–A3) and the three-way catalysts (B1–B3) are set so that the timing at which HC starts to be desorbed from the HC adsorbing units (A1–A3) is later than the timing at which HC starts to be oxidized by the three-way catalysts (B1–B3) situated downstream. In this way, HC which are discharged from the engine during a cold start are efficiently purified.

13 Claims, 3 Drawing Sheets

EXHAUST PURIFIER AND MANUFACTURING METHOD OF SAME

FIELD OF THE INVENTION

This invention relates to an exhaust purifier for purifying hydrocarbons (HC) in the exhaust gas of an engine using an HC adsorbing unit and a three-way catalyst.

BACKGROUND OF THE INVENTION

With regard to an exhaust purifier of a vehicle engine, Tokkai Hei 7-332073 published by the Japanese Patent Office in 1995 discloses an exhaust purifier wherein a three-way catalyst is disposed at a predetermined distance downstream of an HC adsorbing unit which adsorbs hydrocarbons (HC) in low temperature exhaust. According to this prior art, HC in the exhaust is adsorbed by the HC adsorbing unit when the engine is cold, and the activated three-way catalyst oxidizes HC desorbed from the HC adsorbing unit when engine warm-up is complete.

The reason why a space is left between the HC adsorbing unit and three-way catalyst is to avoid these catalysts reacting together under high temperature conditions.

This prior art further discloses that three-way catalysts having different compositions are installed downstream and upstream of the HC adsorbing unit so as to be able to oxidize all hydrocarbons, i.e., olefin hydrocarbons, paraffin group hydrocarbons and aromatic hydrocarbons.

SUMMARY OF THE INVENTION

HC adsorbing units require a predetermined capacity in order to provide the necessary adsorption performance. If the capacity of the HC adsorbing unit is increased, the heat capacity, i.e., the heat mass, also becomes large, and as a result, the exhaust gas temperature at the inlet of the three-way catalyst downstream of the HC adsorbing unit falls, and activation of the three-way catalyst is slower.

However, if activation of the three-way catalyst is not completed at the stage when desorption of HC from the HC adsorbing unit has begun, desorbed HC will be discharged into the atmosphere without being purified.

It is therefore an object of this invention to enhance the HC oxidation capability of a three-way catalyst while maintaining the adsorption capability of an HC adsorbing unit, in an exhaust purifier in which the HC adsorbing unit and a three-way catalyst are disposed in series.

It is a further object of this invention to facilitate manufacture of an exhaust purifier in which plural catalysts or adsorbing units are disposed in series.

In order to achieve the above objects, this invention provides an exhaust purifier disposed in an exhaust passage of an engine, comprising a shell having an inlet and an outlet connected to the exhaust passage, a plurality of hydrocarbon adsorbing units accommodated in the shell, and a plurality of three-way catalysts accommodated in the shell. The adsorbing units and catalysts are alternately disposed in series and one of the adsorbing units is disposed at the nearest position to the inlet.

This invention also provides a manufacturing method of the exhaust purifier interposed in an exhaust passage of an engine. The method comprises fixing plural HC adsorbing units at a predetermined distance apart to a cylindrical first element, fixing plural three-way catalysts at a predetermined distance apart to a cylindrical second element, and fixing the first element and second element to each other such that the HC adsorbing units and the three-way catalysts are alternately accommodated in a substantially cylindrical shell formed by the first element and the second element.

The details as well as other features and advantages of this invention are set forth in the remainder of the specification and are shown in the accompanying drawings.

DESCRIPTION OF THE PREFERRED EMBODIMENTS

Figure 1:
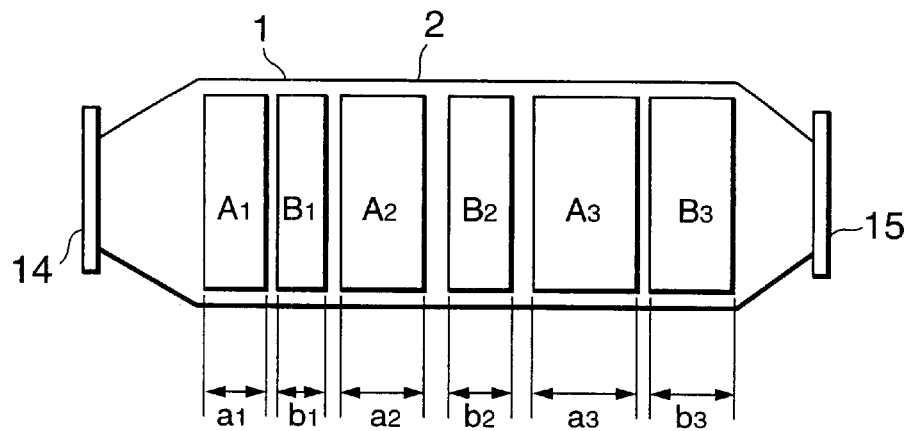
FIG. 1 is a schematic longitudinal sectional view of an exhaust purifier according to this invention.

Referring to FIG. 1 of the drawings, an exhaust purifier 1 comprises a shell 2 comprising an inlet 14 and outlet 15. The inlet 14 and outlet 15 are connected to an exhaust passage of a vehicle engine. Three HC adsorbing units A1–A3 and three three-way catalysts B1–B3 are accommodated in the shell 2, wherein the HC adsorbing units A1–A3 and three-way catalysts B1–B3 are disposed alternately with the HC adsorbing unit A1 closest to the inlet 14. The HC adsorbing units A1–A3 and three-way catalysts B1–B3 are all formed on ceramic substrates 3.

Figure 2:
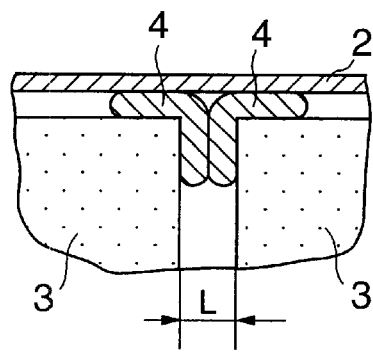
FIG. 2 is longitudinal sectional view of the essential parts of a shell of the exhaust purifier describing the supporting structure of a ceramic substrate according to this invention.

The ceramic substrates 3 are disposed at a predetermined spacing L in the shell 2, and a ring 4 shown in FIG. 2 fixes the outer circumference of the edge of each ceramic substrate 3 to the shell 2.

Figure 3:
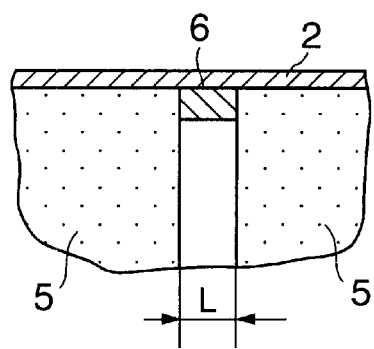
FIG. 3 is a longitudinal sectional view of the essential parts of the shell of the exhaust purifier describing the supporting structure of a metal substrate according to this invention.
Figure 5:
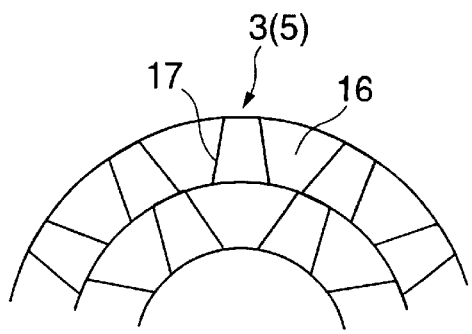
FIG. 5 is an enlarged cross-sectional view of the essential parts of the substrate according to this invention.

If metal substrates are used instead of ceramic substrates, as shown in FIG. 3, spacers 6 are inserted between metal substrates 5, and the metal substrates 5 are directly fixed by welding or the like to the inner circumference of the shell 2. The ceramic substrates 3 and metal substrates 5 both comprise numerous cells 16 formed by partitions 17 as shown in FIG. 5.

The HC adsorbing units A1–A3 together have the capacity necessary to adsorb hydrocarbons (HC) in the engine exhaust gas. The three-way catalysts B1–B3 together have the capacity necessary to oxidize hydrocarbons (HC) and carbon monoxide (CO) and reduce carbon monoxide (NOx) in the engine exhaust gas.

Whether the ceramic substrates 3 or metal substrates 5 are used, the heat capacity of a HC adsorbing unit A1–A3 is set so that it is greater the closer the HC adsorbing unit A1–A3 is to the outlet 15. Also, the HC adsorbing units A1–A3 are set to have a larger heat capacity than the three-way catalysts located downstream, i.e., the heat capacity of the HC adsorbing unit A1 is larger than that of the three way catalyst B1, the heat capacity of the HC adsorbing unit A2 is larger than that of the three way catalyst B2, and the heat capacity of the HC adsorbing unit A3 is larger than that of the three way catalyst B3.

According to this embodiment, to realize this heat capacity relation, the lengths of all the substrates 3(5) of the HC adsorbing units A1–A3 and three-way catalysts B1–B3 progressively increase from the inlet 14 to the outlet 15.

Further, the lengths of the substrates 3(5) of HC adsorbing units A1–A3 are set larger than the lengths of the substrates 3(5) of three-way catalysts B1–B3 located downstream. Therefore, if the lengths of the substrates 3(5) of the HC adsorbing units A1–A3 are a1, a2, a3 and the lengths of the substrates of the three-way catalysts B1–B3 are b1, b2, b3, the following relations hold.

$a1<a2<a3$, $b1<b2<b3$, $a1>b1$, $a2>b2$, and $a3>b3$.

By setting lengths of the HC adsorbing units and three-way catalysts in this way, the HC adsorbing units A1–A3 and three-way catalysts B1–B3 may be set to have optimum temperature increase characteristics. Specifically, the heat capacity of an HC adsorbing unit situated upstream of a three-way catalyst is less than the heat capacity of the HC adsorbing unit situated downstream of the three-way catalyst, so the temperature of the exhaust gas when it reaches the inlet of the three-way catalyst is not lowered much by passing through the upstream HC adsorbing unit, and the three-way catalysts can be rapidly made to achieve their activation temperatures. There is thus a higher probability that activation of the three-way catalyst situated downstream will be complete when desorption of HC from the upstream HC adsorbing unit starts.

As a result, there is little probability that the HC desorbed from the HC adsorbing units A1–A3 will be discharged into the atmosphere without oxidation, and a desirable effect is achieved in suppressing HC discharge when the engine is cold.

Figure 4:
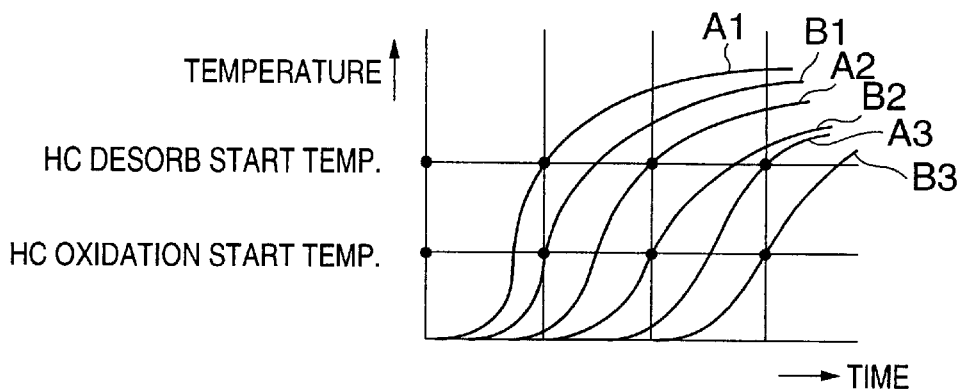
FIG. 4 is a diagram showing a relation between an HC oxidation start temperature of the three-way catalyst and an HC desorbing start temperature of the HC adsorbing unit according to this invention.

When the heat capacity is set as described above, the relation between the HC desorption start temperature of the HC adsorbing units A1–A3 and the oxidation start temperature of the three-way catalysts B1–B3 is shown in FIG. 4.

As can be seen from this diagram, the HC adsorbing units A1, A2, A3 reach the HC desorption start temperature in the sequence A1, A2, A3, and the three-way catalysts B1, B2, B3. reach the HC oxidation start temperature in the sequence B1, B2, B3. Focusing now on adjacent HC adsorbing units and three-way catalysts, e.g., the HC adsorbing unit A1 and three-way catalyst B1, when the HC adsorbing unit A1 reaches the HC desorption start temperature, the three-way catalyst B1 also reaches the HC oxidation start temperature. Also, when the HC adsorbing unit A1 reaches the HC desorption start temperature, the temperature of the downstream HC adsorbing unit A2 is much less than the HC desorption start temperature. This depends on the setting of the heat capacity of the HC adsorbing units and the setting of the spacing L. The latter has the effect of preventing the heat of reaction of the three-way catalyst from reaching the downstream HC adsorbing unit.

Therefore, HC which could not be converted by the three-way catalyst B1, is re-adsorbed by the downstream HC adsorbing unitn A2. This characteristic is useful for suppressing discharge of HC when the engine is cold.

Similar temperature relations exists among the HC adsorption unit A2, three-way catalyst B2, HC adsorption unit A3 and three-way catalyst B3.

Next, the settings of the number of the cells 16 of the substrates 3(5) of the HC adsorbing units A1–A3 and three-way catalysts B1–B3 will be described.

To ensure that HC desorbed from the HC adsorbing units is efficiently oxidized by the downstream three-way catalysts, it is desirable to make the number of the cells 16 of the substrates 3(5) of the HC adsorbing units A1–A3 less than the number of the cells 16 of the substrates 3(5) of the three-way catalysts B1–B3.

For example, it is preferred that the number of the cells 16 of the substrates 3(5) of the HC adsorbing units A1–A3 is 200–300 per square inch, and the number of the cells 16 of the substrates 3(5) of the three-way catalysts B1–B3 is 600~900 per square inch.

When the number of the cells 16 of the substrates 3(5) of the HC adsorbing units A1–A3 is reduced, if the coating amount of adsorbent such as zeolite is constant, the coating layer of adsorbent on each cell 16 is thicker compared with the case when there is a large number of the cells 16. The thick coating layer makes it difficult to desorb adsorbed HC, and the desorption start timing of HC is therefore delayed.

If the number of the cells 16 of the substrates 3(5) of the three-way catalysts B1–B3 is set large, the strength of the substrates 3(5) is increased, and the walls of the partitions 17 which form the cells 16 can be made thinner. As a result, the heat capacity of the substrates 3(5) is reduced, and the temperature of the substrates 3(5) increases earlier. In other words, activation of the three-way catalysts B1–B3 is advanced, the HC oxidation start temperature is reached earlier, and HC oxidizing performance is also enhanced.

More preferably, the amount of noble metals such as platinum, palladium and rhodium which are occluded in the substrates of the HC adsorbing units A1–A3 and three-way catalysts B1–B3 is set as follows. The noble metal amount supported by the HC adsorbing units A1–A3 is set to be less than the noble metal amount supported by the three-way catalysts B1–B3. Due to this, the heat released by the coating layer of the HC adsorbing units A1–A3 is reduced, and desorption of adsorbed HC is more difficult. The noble metal amount supported by the HC adsorbing units A1–A3 can also be set to be zero.

On the other hand, if the noble metal occlusion amounts of the substrates of the three-way catalysts B1–B3 are increased, temperature increase characteristics of the substrates are improved, activation of the three-way catalysts B1–B3 is advanced, and the time required to reach the HC oxidation start temperature is shortened.

Next, referring to FIGS. 6 and 7, a preferred construction to simplify manufacture of this exhaust purifier 1 will be described.

Figure 6:
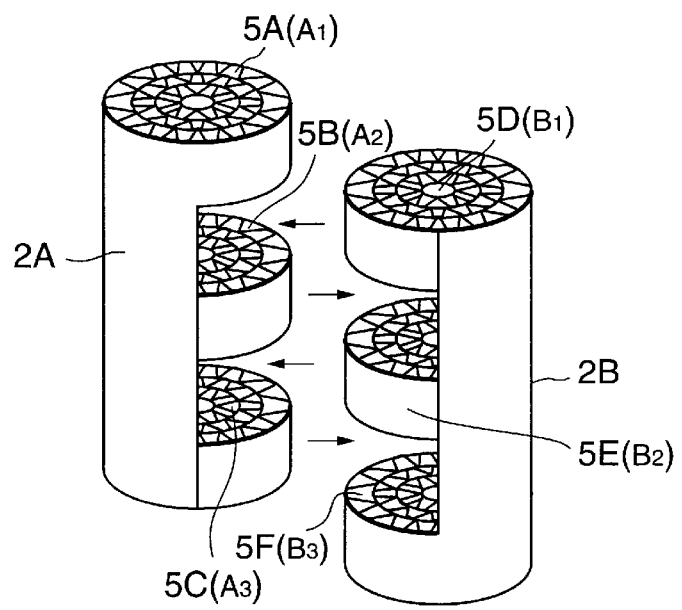
FIG. 6 is a perspective view of a first and second element prior to assembly, according to this invention.

The shell 2 is divided into elements 2A and 2B as shown in FIG. 6.

Metal substrates 5A–5C are used for the HC adsorbing units A1–A3. They are fixed by welding to the inner circumference of the element 2A. Likewise, metal substrates 5D–5F are used for the three-way catalysts B1–B3. They are fixed by welding to the element 2B. In FIGS. 6 and 7, the inlet 14 and outlet 15 of the shell 2 are omitted.

The metal substrates 5A–5C are immersed together in a solution of HC adsorbent, lifted out of the solution, and dried by an air blower. The HC adsorbent is thereby coated on the metal substrates 5A–5C.

An identical treatment is given to the metal substrates 5D–5F using a three-way catalyst solution.

The element 2A supporting the substrates 5A–5C and the element 2B supporting the substrates 5D–5F are then assembled as shown by the arrows in FIG. 6.

Figure 7:
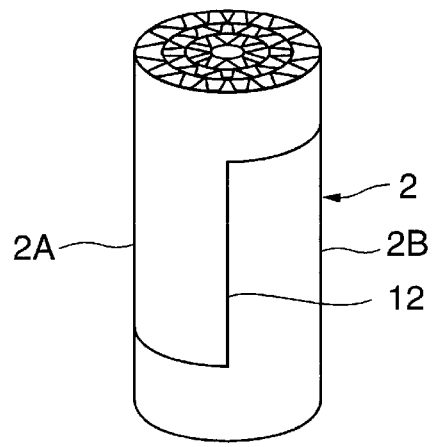
FIG. 7 is a perspective view of the first and second elements after assembly, according to this invention.

Join parts 12 of the first element 2A and second element 2B shown in FIG. 7 are welded so that the elements 2A and 2B form the one-piece shell 2.

In general, in exhaust purifiers using metal substrates, the shell was divided into short cylindrical elements of equal number to the substrates, and after fixing the metal substrates to the elements, the elements were welded together.

However, by forming the shell 2 by two elements 2A, 2B as described heretofore, the number of coating and welding steps is reduced, and manufacture of the exhaust purifier is simplified.

Figure 8:
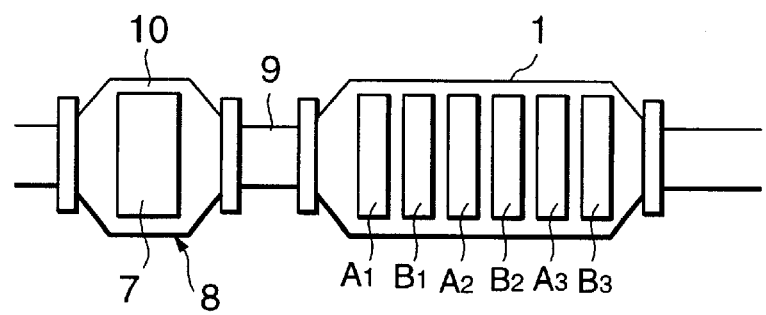
FIG. 8 is a schematic longitudinal sectional view of an exhaust purifier according to a second embodiment of this invention.

Next, a second embodiment of this invention will be described referring to FIG. 8.

According to this embodiment, a three-way catalytic converter 8 comprising a three-way catalyst 7 and shell 10 is disposed upstream of the exhaust purifier 1 of the first embodiment in an exhaust passage 9. By arranging the separate three-way catalytic converter 8 nearer the engine, i.e., in a position where the exhaust gas temperature is highest, the three-way catalyst 7 is activated early during a cold start, and HC in the exhaust gas is oxidized early. At least part of the HC in the exhaust is oxidized before the exhaust gas arrives at the HC adsorbing unit A1, so HC processing efficiency when the engine is cold is further improved.

Figure 9:
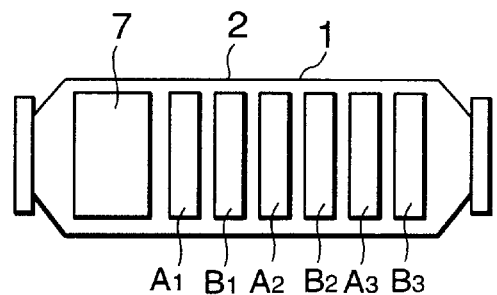
FIG. 9 is a schematic longitudinal sectional view of an exhaust purifier according to a third embodiment of this invention.

Finally, a third embodiment of this invention will be described referring to FIG. 9. This embodiment is based on an identical concept to that of the second embodiment, however in this embodiment, instead of providing the independent three-way catalytic converter 8, the three-way catalyst 7 is accommodated in the most upstream part of the exhaust purifier 1.

The contents of Tokugan Hei 10-120669, with a filing date of Apr. 30, 1998 in Japan and Tokugan Hei 10-136611 with a filing date of May 19, 1998 in Japan are hereby incorporated by reference.

Although the invention has been described above by reference to certain embodiments of the invention, the invention is not limited to the embodiments described above. Modifications and variations of the embodiments described above will occur to those skilled in the art, in light of the above teachings.

For example, in the above embodiments, the exhaust purifier comprised three HC adsorbing units A1–A3 and three three-way catalysts B1–B3, but this invention may be applied to any exhaust gas purification device in which plural HC adsorbing units and three-way catalysts are disposed alternately in series.

The embodiments of this invention in which an exclusive property or privilege is claimed are defined as follows:

1. An exhaust purifier disposed in an exhaust passage of an engine, comprising:
   a shell having an inlet and an outlet, the inlet being connected to said exhaust passage,
   a plurality of hydrocarbon adsorbing units (HC adsorbing units) accommodated in said shell, and
   a plurality of three-way catalysts accommodated in said shell,
   wherein, said adsorbing units and catalysts are alternately disposed in series and one of said adsorbing units is disposed immediately downstream of said inlet,
   wherein said HC adsorbing units and said three-way catalysts respectively have a heat capacity which increases as a respective distance from each HC adsorbing unit and each three-way catalyst to said outlet, decreases, and wherein said HC adsorbing units each has a heat capacity which is greater than a heat capacity of the three-way catalyst which is adjacent to and downstream thereof.

2. An exhaust purifier as defined in claim 1, wherein the number of said HC adsorbing units and the number of said three-way catalysts are identical, and are disposed at mutually predetermined distances apart.

3. An exhaust purifier as defined in claim 1, wherein the lengths of said HC adsorbing units respectively increases in the exhaust flow direction toward said outlet, wherein the lengths of said three-way catalysts respectively increase in the exhaust flow direction toward said outlet, and wherein the length of any HC adsorbing unit is greater than the length of a three-way catalyst which is adjacent to and downstream thereof.

4. An exhaust purifier as defined in claim 1, wherein said HC adsorbing units and said three-way catalysts respectively comprise substrates which comprise plural cells, and wherein the number of said cells of the substrates of said HC adsorbing units is less than the number of the cells of the substrates of said three-way catalysts.

5. An exhaust purifier as defined in claim 4, wherein the number of said cells of the substrates of said HC adsorbents is set to be 200–300 per square inch while the number of the cells of the substrates of said three-way catalysts is set to be 600–900 per square inch.

6. An exhaust purifier as defined in claim 1, wherein said HC adsorbing units and said three-way catalysts respectively comprise substrates which comprise plural cells, and the thickness of partitions forming the cells of the substrates of said three-way catalysts is set to be thinner than the thickness of the partitions forming the cells of the substrates of said HC adsorbing units.

7. An exhaust purifier as defined in claim 1, wherein said three-way catalysts and said HC adsorbing units contain noble metals, and wherein said three-way catalysts contain more noble metals than said HC adsorbing units.

8. An exhaust purifier as defined in claim 1, wherein said purifier further comprises another three-way catalyst disposed at a predetermined distance upstream of the inlet.

9. An exhaust purifier as claimed in claim 1, wherein said shell comprises a first semi-cylindrical element and a second semi-cylindrical element, said HC adsorbing units are fixedly supported on said first semi-cylindrical element, said three-way catalysts are fixedly supported on said second semi-cylindrical element, and said first semi-cylindrical element and said second semi-cylindrical element are fixed to each other so that said HC adsorbing units and said three-way catalysts are interleaved with one another.

10. An exhaust purifier as defined in claim 9, wherein said HC adsorbing units comprise first metal substrates fixed to said first semi-cylindrical element and a coating material coated on said first substrates, and said three-way catalysts comprise second metal substrates fixed to said second semi-cylindrical element and a coating material coated on said second metal substrates.

11. An exhaust purifier as defined in claim 8, wherein the predetermined distance is longer than the distances between any adjacent HC adsorbing unit and three-way catalyst.

12. A method of manufacturing an exhaust purifier interposed in an exhaust passage of an engine, comprising:

fixing plural HC adsorbing units at a predetermined distance apart to a semi-cylindrical first element, fixing plural three-way catalysts at a predetermined distance apart to a semi-cylindrical second element, and fixing said first semi-cylindrical element and said second semi-cylindrical element to each other such that said HC adsorbing units and said three-way catalysts are alternatively accommodated in a substantially cylindrical shell formed by said first semi-cylindrical element and said second semi-cylindrical element, such that the substantially cylindrical shell has an inlet and an outlet, such that a HC adsorbing unit is disposed immediately downstream of the inlet of the substantially cylindrical shell, and such that the HC adsorbing units and the three-way catalysts are interleaved with one another within the substantially cylindrical shell, wherein said HC adsorbing units and said three-way catalysts respectively have a heat capacity which increases as a respective distance from each HC adsorbing unit and each three-way catalyst to said outlet, decreases, and wherein said HC adsorbing units each has a heat capacity which is greater than a heat capacity of the three-way catalyst which is adjacent to and downstream thereof.

13. A manufacturing method as defined in claim 12, further comprising forming said HC adsorbing units by immersing metal substrates which have been fixed at said predetermined distance apart to said first element in a solution of a coating material, and forming said three-way catalyst by immersing metal substrates which have been fixed at said predetermined distance apart to said second element in a solution of a coating material.

* * * * *